US 8,246,114 B2

(12) United States Patent
Winter et al.

(10) Patent No.: US 8,246,114 B2
(45) Date of Patent: Aug. 21, 2012

(54) UTILITY SEAT

(75) Inventors: Jens Winter, Gau-Bischofsheim (DE); Jürgen Maier, Weitersweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/953,312

(22) Filed: Nov. 23, 2010

(65) Prior Publication Data

US 2011/0210589 A1   Sep. 1, 2011

(30) Foreign Application Priority Data

Nov. 26, 2009   (DE) .......................... 10 2009 055 831

(51) Int. Cl.
*A47C 15/00* (2006.01)
(52) U.S. Cl. ...................................................... 297/234
(58) Field of Classification Search ................... 297/248, 297/255, 331, 257, 475, 487, 234; 160/26
See application file for complete search history.

(56) References Cited

U.S. PATENT DOCUMENTS

| | | | | |
|---|---|---|---|---|
| 1,985,222 | A | * | 12/1934 | Menhall ........................ 297/223 |
| 3,273,877 | A | * | 9/1966 | Geller et al. .................... 267/89 |
| 4,790,592 | A | * | 12/1988 | Busso et al. .............. 297/184.11 |
| 5,342,111 | A | | 8/1994 | Charles |
| 6,382,720 | B1 | * | 5/2002 | Franklin et al. .......... 297/228.13 |
| 2010/0140996 | A1 | | 6/2010 | Winter |

FOREIGN PATENT DOCUMENTS

| | | |
|---|---|---|
| DE | 1685303 A1 | 7/1971 |
| DE | 3102881 A1 | 8/1982 |
| DE | 10133241 A1 | 5/2002 |
| DE | 102005030386 A1 | 1/2007 |
| DE | 102007023370 A1 | 11/2008 |
| DE | 102008060747 A1 | 6/2010 |
| FR | 2588171 A1 | 4/1987 |
| FR | 2816895 A1 | 5/2002 |
| GB | 2465878 A | 6/2010 |

OTHER PUBLICATIONS

German Patent Office, German Search Report for Application No. 102009055831.4, dated Sep. 6, 2010.
UK IPO, British Search Report for Application No. 1019508.9, dated Mar. 2, 2011.

* cited by examiner

*Primary Examiner* — Milton Nelson, Jr.
(74) *Attorney, Agent, or Firm* — Ingrassia Fisher & Lorenz, P.C.

(57) ABSTRACT

A utility seat encompasses a length of fabric of a tear-resistant, flexible material that can be secured to two spaced apart vehicle seats in a row of seats between the two vehicle seats to form the utility seat. A backrest section and a seat section are arranged thereupon. The length of fabric can be refracted into a cassette to be arranged between the vehicle seats when the utility seat is not in use, and extended from the cassette when using the utility seat. The cassette has a width configured to accommodate the length of fabric.

15 Claims, 2 Drawing Sheets

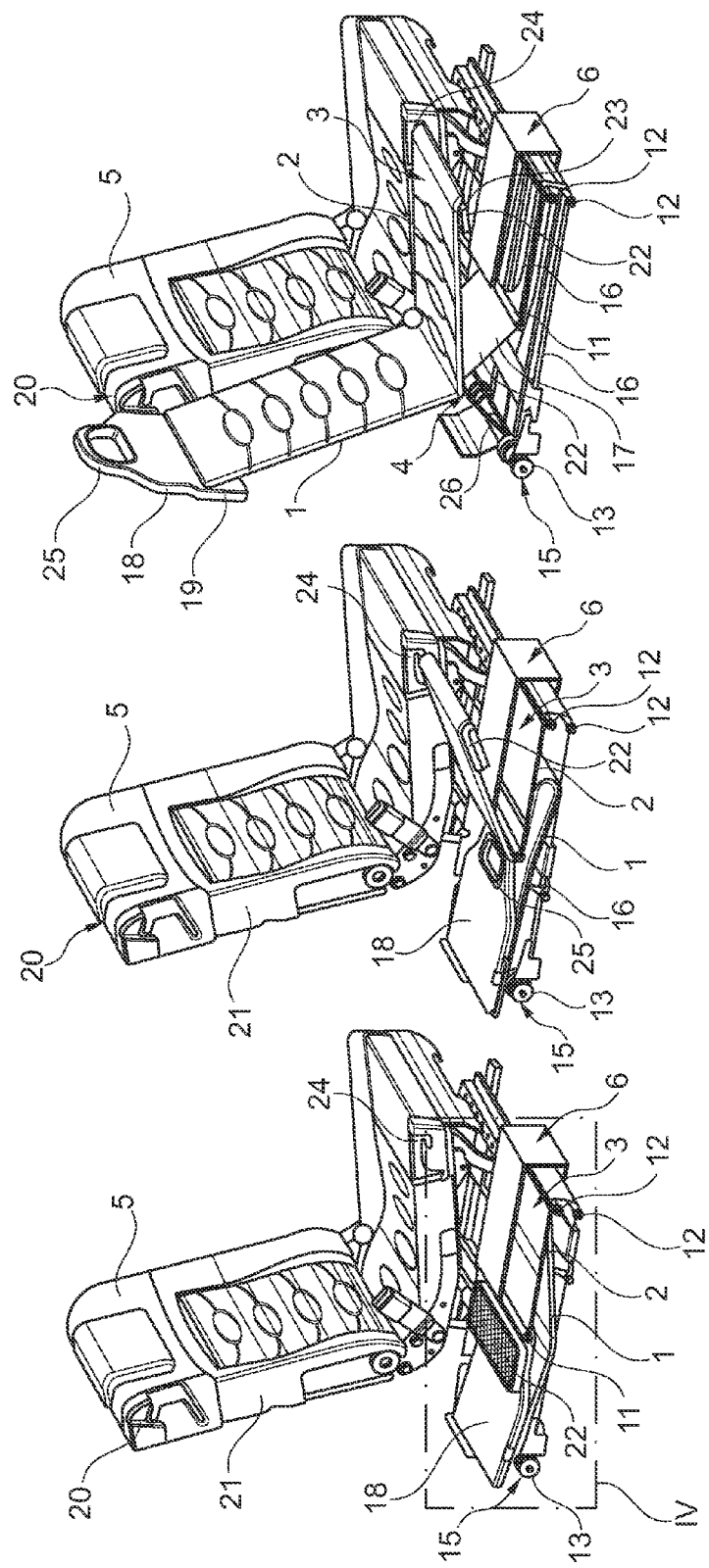

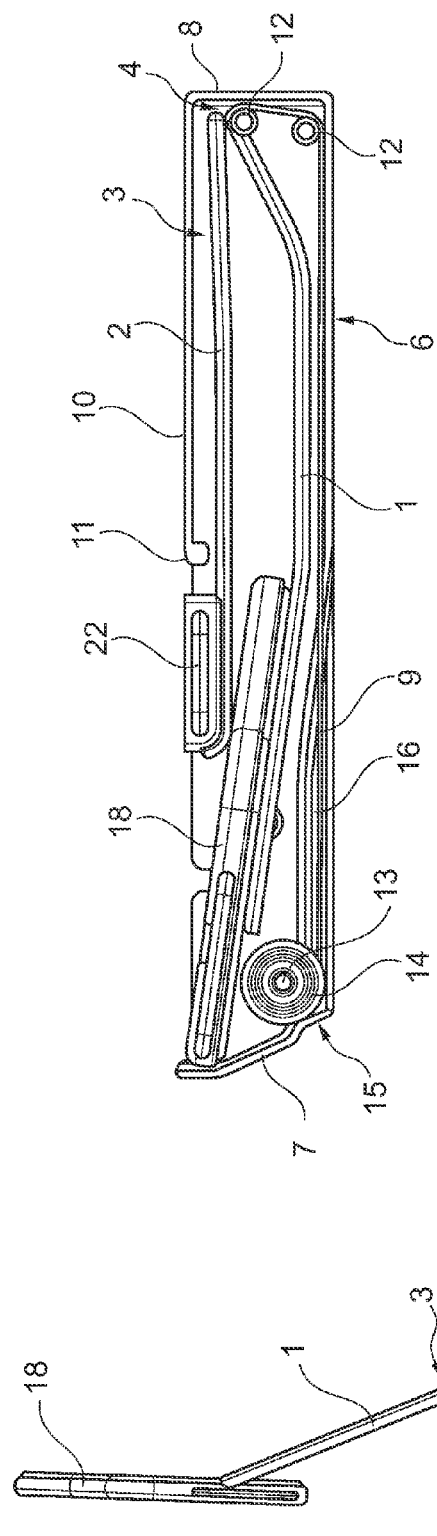
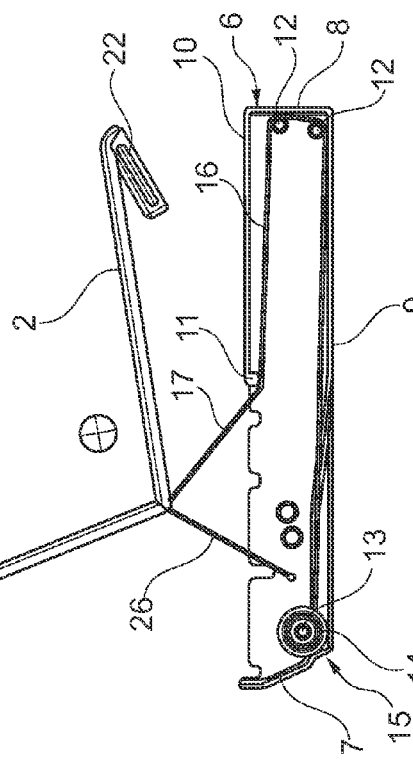
Fig. 4
Fig. 5

UTILITY SEAT

CROSS-REFERENCE TO RELATED APPLICATION

This application claims priority to German Patent Application No. 102009055831.4, filed Nov. 26, 2009, which is incorporated herein by reference in its entirety.

TECHNICAL FIELD

The technical field relates to a utility seat with a length of fabric of a tear-resistant, flexible material that can be secured to two spaced apart vehicle seats in a row of seats between the two vehicle seats to form the utility seat, and a backrest section and a seat section arranged thereupon.

BACKGROUND

All seats in a passenger car are occupied in less than one percent of all trips. In particular, the middle seat in passenger cars with a row of seats having three seats is occupied only on very rare occasions. This means that a portion of the vehicle seats has no utility in most trips, which applies in particular to the middle seat of the rear row of seats. The space taken up by the unneeded vehicle seats leads to lost comfort relative to the used vehicle seats. For example, this configuration of the three-seat rear row of seats results in a greater loss in comfort on the outer vehicle seats than would be incurred in a row of seats configured with two vehicle seats designed as individual seats.

DE 31 02 881 A1 discloses an emergency seat arrangement for a motor vehicle, in which an emergency seat essentially has a tear-resistant, flexible and collapsible length of fabric can be designed in such a way as to deploy an emergency seat using the length of fabric by means of a hook anchored in a vehicle floor to create the seat surface and a hook that engages a rope transversely tensioned in the motor vehicle to create the backrest. When not in use, the length of fabric is rolled or folded up, and stowed in a location provided for this purpose in the motor vehicle. The emergency seat is arranged and configured in the motor vehicle independently of vehicle seat rows. Special anchoring points must be provided in the vehicle floor for attachment.

DE 1 685 303 U further describes an intermediate seat for buses, which can be arranged on two vehicle seats of a row of seats, bridging two spaced apart seats. It is provided in the form of a length of fabric that can be rolled up like a blind, and is furnished on one side with a tube having two forks. The forks can be used to hook the intermediate seats on receiving elements of the vehicle seats that form gripping rods, so that the length of fabric can then be rolled out, bridging the gap between the two spaced apart vehicle seats to creates a seat surface with backrest. The edge areas of the length of fabric are here placed loosely on the spaced apart vehicle seats, and the seat surface is created solely by the steel bands incorporated into the fabric. However, this is associated with a loss in comfort to the extent that the seat surface can move relative to the adjacent vehicle seats, for example while driving through curves.

In order to be able to design utility seats to reflect contemporary comfort requirements, it is preferable that such a seat only be present when actually required.

In view of the foregoing, it is at least one object to provide a utility seat of the kind mentioned at the outset that is easy to use, and can be reliably stowed away when not in use. In addition, other objects, desirable features and characteristics will become apparent from the subsequent summary and detailed description, and the appended claims, taken in conjunction with the accompanying drawings and this background.

SUMMARY

According to an embodiment, the at least one object is achieved by virtue of the fact that the length of fabric can be retracted into a cassette to be arranged between the vehicle seats when the utility seat is not in use, and extended from the cassette when using the utility seat. The cassette has a width configured to accommodate the length of fabric.

In the cassette, the length of fabric of the utility seat is protected against contamination and damage when not in use. In addition, such a cassette is easy to use, and, for purposes of using the utility seat, can be easily and reliably secured in a motor vehicle, preferably between two vehicle seats, in particular by means of preferably lockable attachment devices. The utility seat and/or its cassette of course do not have to be exclusively installed between two vehicle seats; rather, for example, the invention expressly encompasses installation between a vehicle seat and motor vehicle body column. In addition, the vehicle seat can of course also be a seat bench. Attachment components for the utility seat can be secured to both body elements, such as columns, and on seat benches.

To make the utility seat easy and comfortable to use for a user, the cassette advantageously incorporates a spring mechanism that reels in the length of fabric into the cassette when not in use, and pre-stresses it during use. The spring mechanism ensures an automatic, uniform reeling and unreeling of the length of fabric.

The length of fabric has a material tailored to the demands placed on a seat. In order to be able to use a material suitable for tensioning and fixing the length of fabric, the spring mechanism is best connected with the length of fabric via at least one clamping brace, in particular in the area where the backrest section meets the seat section, the so-called nip. Given a high strength, the clamping brace can be thinner than the potentially upholstered length of fabric, so that the lap roll present in the reeled state with the utility seat not in use exhibits a relatively small diameter, which can result in a relatively low overall height of the cassette.

The ends of the length of fabric are preferably provided with attachment elements for purposes of mounting to the adjacent vehicle seats. The attachment elements of the utility seat are allocated to the vehicle seats in such a way that the backrest section or seat section of the utility seat is located precisely in the seat or backrest plane formed by the vehicle seats, in particular individual vehicle seats. As configured, the free end of the seat section of the length of fabric has a plate extending over the width of the length of fabric, the face of which is provided with the respective attachment elements to be hooked into retaining cranks on the lateral cheeks of the vehicle seats. The plate is located in particular under the length of fabric during use. The plate imparts to the length of fabric comprising the utility seat with a certain measure of stability over its width, while preserving elasticity, thereby allowing the user of the utility seat to sit comfortably, at the same time ensuring ease of use. In addition, the plate can have a so-called anti-submarining function, in that it prevents a passenger to slide forward during a head-on collision toward the front of the motor vehicle, to which end an airbag can also be integrated into the plate, for example. The retaining cranks on the lateral cheeks of the vehicle seats are preferably joined with the structure of the vehicle seat to ensure reliable attachment. The plate can exhibit a sandwich structure, and its exterior can have a foam cushion enveloping a harder core.

In a further development, the free end of the backrest section of the length of fabric has a support plate extending over the width of the length of fabric, in particular with a headrest function, the face of which is provided with the respective attachment elements to be hooked into retaining devices on the lateral cheeks of the vehicle seats. In particular the retaining devices are designed as preferably boltable locks. As in the case of the plate, the support plate can consist of a sandwich structure, and its exterior can have a foam cushion enveloping a harder core. The upper edge of the support plate extends over and beyond the upper edge of the backrests of the adjacent vehicle seats, thus providing a headrest. Of course, the headrest function can be omitted, in which case the upper edge of the support plate runs along a single plane with the upper edges of the backrests of the vehicle seats.

It is preferred that the cassette be rectangular, and that the spring mechanism be arranged in the area of the one face. Two mutually spaced apart deflection rollers are mounted one over the other on the other face. The distance between the deflection rollers and spring mechanism is such that the backrest section of the length of fabric with the support plate can be accommodated in the cassette in its entire length without being reeled up. The support plate is situated above the spring mechanism, and the nip runs parallel thereto in the area of the deflection rollers on the opposing face, and the seat section with the plate is located over the latter.

In order to reliably stow the length of fabric with the utility seat not in use, an upper cover plate of the cassette proceeds from the face with the deflection rollers and extends roughly over half the length of the cassette, accommodating a roller at its free end. The spring mechanism is best coupled with winding rollers arranged on a shaft in a torsion-resistant manner, which are used to reel and unreel the clamping braces, which are guided via the deflection rollers and, with the utility seat in use, via the roller. The clamping braces pass over into a retaining web fixed at the nip of the length of fabric. The clamping braces are unreeled from the spring mechanism for use, and incrementally taken out of the cassette via the deflection rollers and roller as the backrest section or seat section of the length of fabric is shifted. One end of a retaining strap is advantageously secured in the area of the shaft, in particular to a lateral wall of the cassette, the other end of which is fixed on the nip of the length of fabric. Consequently, the clamping braces and retaining straps work in different directions, and stabilize the utility seat.

In another configuration, the cassette is secured to the floor of the motor vehicle, or can be removed from the motor vehicle with the length of fabric retracted. After the cassette has been removed, it is not disruptive, and a corresponding free space become s available inside the motor vehicle, for example to accommodate long objects through a loading space in a passenger compartment, or slide vehicle seats one on top of the other, or secure other objects, such as a cooler or storage box with or without armrest between the vehicle seats.

BRIEF DESCRIPTION OF THE DRAWINGS

The present invention will hereinafter be described in conjunction with the following drawing figures, wherein like numerals denote like elements, and:

FIG. 1 is a perspective view of a utility seat according to the invention when not in use, with an adjacent vehicle seat;

FIG. 2 is another perspective view of the utility seat according to FIG. 1 when not in use;

FIG. 3 is a perspective view of the utility seat according to FIG. 1 when in use;

FIG. 4 is a side view of detail IV according to FIG. 1 on a magnified scale; and FIG. 5 is a simplified side view of the depiction according to FIG. 3 without adjacent vehicle seat.

DETAILED DESCRIPTION

The following detailed description is merely exemplary in nature and is not intended to limit application and uses. Furthermore, there is no intention to be bound by any theory presented in the preceding background or the following detailed description.

The utility seat encompasses a length of fabric 3 having a backrest section 1 and a seat section 2 arranged thereon, which can of course be fabricated in one part or one piece, and can also be comprised of the backrest section 1 and the seat section 2 sewn thereto. The area between the backrest section 1 and seat section 2 is referred to as the nip 4. The length of fabric 3 has a tear-resistant, flexible material, and, for use as intended as a utility seat, can be secured to both vehicle seats 5 to form the utility seat between two spaced apart vehicle seats 5 of a row of seats. With the utility seat not in use, the length of fabric 3 can be retracted to save space into a cassette 6 fixed between the vehicle seats 5 on the floor of a motor vehicle, the width of which is designed to accommodate the length of fabric 3.

The cassette 6 is rectangular, with a rear side 7 facing in the direction of the tail of the motor vehicle, a front side 8 facing in the direction of the front of the motor vehicle, two lateral sections, a floor plate 9 and an upper cover plate 10, which proceeds from the front side 8 and extends roughly over half the length of the cassette 6, and accommodates a roller 11 at its free end. Two parallel and spaced apart deflection rollers 12 mounted on the lateral sections of the cassette 6 are provided in the area of the front side 8, and a shaft 13 with winding rollers 14 arranged in a torsion-resistant manner is provided on the opposing rear side 7, and coupled with a spring mechanism 15. Affixed to the winding rollers 14 are clamping braces 16, which are guided essentially parallel to the floor plate 9 and via the two deflection rollers 12, and pass over into a retaining web 17 fixed at the nip 4 of the length of fabric 3.

The free end of the backrest section 1 of the length of fabric 3 is provided with a support plate 18 with a headrest function that extends over the width of the length of fabric 3, the face of which is furnished with respective attachment elements 19 to be hooked into retaining devices 20 designed as boltable and unboltable locks on the lateral cheeks 21 of the vehicle seats 5. The support plate 18 can have a sandwich material, and have a cushion. With the utility seat not in use, the area in which the support plate 18 is connected with the length of fabric 3 is located in the region of the rear side 7 of the cassette 6, and the support plate 18 projects at an inclination toward the floor plate 9. The free end of the support plate 18 is roughly in an area below the roller 11, and the support plate 18 sits on the backrest section 1 of the length of fabric 3. Of course, the cassette 6 can exhibit guiding means and/or locking means, which in particular interact with the attachment elements 19 of the support plate 18, so as to keep the latter in a defined position in the cassette 6.

The free end of the seat section 2 of the length of fabric 3 is connected with a plate 22 that extends over the width of the length of fabric 3, the face of which is furnished with respective attachment elements 23 to be hooked into retaining cranks 24 on the lateral cheeks 21 of the vehicle seat 5. With the utility seat not in use, the plate 22 is situated directly adjacent to the roller 11 above the support plate 18, wherein the seat section 2 of the length of fabric 3 runs essentially parallel to the cover plate 10 above the backrest section 1 of the length of fabric 3 and into the cassette 6.

In order to use the utility seat, the plate 22 is first gripped, and the seat section 2 of the length of fabric 3 is guided via the roller 11 and into the open. The clamping braces 16 are here unreeled from the winding rollers 14 against the force exerted by the spring mechanism 15. The attachment elements 23 of the plate 22 hook it into the retaining cranks 24 on the lateral cheeks 21 of the vehicle seats 5 in such a way that the plate 22 becomes situated under seat section 2 of the length of fabric 3, wherein the free end of the latter faces roughly in the direction of the shaft 13 with the winding rollers 14. After the plate 22 has been fixed in place, the support plate 18 can be gripped, for which purpose it exhibits a recess 25, and the backrest section 1 of the length of fabric 3 is pulled out of the cassette 6. The support plate 22 is subsequently fixed on the adjacent vehicle seats 5. The utility seat is clamped from the front and back in the area of the nip 4 via the clamping braces 14 and retaining straps 26, one end of which is secured to the nip 4, while the other end is secured in the area of the shaft 13.

The length of fabric 3 is refracted with the utility seat not in use by the force exerted by the spring mechanism 15 after the support plate 18 has first been released from the vehicle seats 5 and stowed in the cassette 6, and the plate 22 has subsequently been separated from the vehicle seats 5. The cassette 6 can be removed from the passenger compartment of the motor vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A utility seat, comprising:
    a first vehicle seat;
    a second vehicle seat spaced apart from the first vehicle seat;
    a seat row between the first vehicle seat and the second vehicle seat;
    a material that is tear-resistant and flexible securable to the first vehicle seat and the second vehicle seat;
    a backrest section;
    a seat section arranged upon the backrest section;
    a cassette with a width that is adapted to accommodate a length of the material,
    wherein the material is adapted to retract into the cassette in a non-use position,
    wherein the material is adapted to extend from the cassette in a use position.

2. The utility seat according to claim 1, further comprising a first attachment element for a first end of the length of fabric and a second attachment element for a second end of the length of fabric, the first attachment element and the second attachment element adapted to attach on the first vehicle seat and the second vehicle seat.

3. The utility seat according to claim 1, further comprising:
    an upper cover plate of the cassette extending over approximately half a cassette length and adapted to accommodate a roller.

4. The utility seat according to claim 1, further comprising:
    a plate extending over the width of the length of the material; and
    an attachment element for the plate adapted to hook into a retaining crank on a lateral cheek.

5. The utility seat according to claim 4, wherein the plate is situated under the length of the material in the use position.

6. The utility seat according to claim 1, further comprising a support plate extending over the width of the length of the material.

7. The utility seat according to claim 6, further comprising attachment elements adapted for hooking into a retaining device on a lateral cheek.

8. The utility seat according to claim 7, wherein the retaining device is a boltable lock.

9. The utility seat according to claim 1, further comprising a spring mechanism adapted to reel in the length of the material into the cassette in the non-use position and pre-stress the length of the material in the use position.

10. The utility seat according to claim 9, further comprising a clamping device adapted to connect the spring mechanism with the length of the material.

11. The utility seat according to claim 10, wherein the clamping device is adapted to connect the spring mechanism with the length of the material in an area where the backrest section meets the seat section.

12. The utility seat according to claim 9, wherein the cassette is substantially rectangular and the spring mechanism is arranged in an area of a first face.

13. The utility seat according to claim 12, further comprising:
    a first deflection roller; and
    a second deflection roller spaced apart from the first deflection roller.

14. The utility seat according to claim 9, further comprising:
    a shaft; and
    a winding roller coupled with the spring mechanism and arranged on the shaft in a torsion-resistant manner.

15. The utility seat according to claim 14, wherein an end of a retaining strap is located in an area of the shaft.

* * * * *